United States Patent

Brown

(10) Patent No.: US 7,541,761 B2
(45) Date of Patent: Jun. 2, 2009

(54) ELECTRIC MOTOR WITH INTEGRAL REGULATOR INDUCTANCE

(75) Inventor: Fred A. Brown, Coronado, CA (US)

(73) Assignee: Comair Rotron Inc, San Diego, CA (US)

( * ) Notice: Subject to any disclaimer, the term of this patent is extended or adjusted under 35 U.S.C. 154(b) by 170 days.

(21) Appl. No.: 11/496,721

(22) Filed: Jul. 31, 2006

(65) Prior Publication Data

US 2007/0040525 A1    Feb. 22, 2007

Related U.S. Application Data

(60) Provisional application No. 60/709,548, filed on Aug. 19, 2005.

(51) Int. Cl.
    *H02P 25/00* (2006.01)
(52) U.S. Cl. .............. 318/400.41; 318/400.01; 318/700; 318/701; 310/168
(58) Field of Classification Search ............ 318/400.41, 318/491, 400.01, 700, 701; 388/835; 310/168
    See application file for complete search history.

(56) References Cited

U.S. PATENT DOCUMENTS

| | | | | |
|---|---|---|---|---|
| 4,149,114 A | * | 4/1979 | Gorjan | 318/731 |
| 4,451,752 A | * | 5/1984 | Tahara et al. | 310/186 |
| 4,454,460 A | * | 6/1984 | Tahara et al. | 318/491 |
| 4,508,988 A | * | 4/1985 | Reiss et al. | 310/154.22 |
| 4,656,533 A | | 4/1987 | Sakai et al. | |
| 4,670,696 A | * | 6/1987 | Byrne et al. | 318/701 |
| 5,331,245 A | * | 7/1994 | Burgbacher et al. | 310/186 |
| 5,739,614 A | * | 4/1998 | Suzuki et al. | 310/180 |
| 2003/0077077 A1 | * | 4/2003 | Smith | 388/800 |

FOREIGN PATENT DOCUMENTS

GB      1161986      8/1969

OTHER PUBLICATIONS

United Kingdom Search Report, dated Nov. 13, 2006, published with United Kingdom Co-Pending application published as GB2429345 dated Feb. 21, 2007.

* cited by examiner

*Primary Examiner*—Rita Leykin
(74) *Attorney, Agent, or Firm*—Dobrusin & Thennisch PC

(57) ABSTRACT

An apparatus and a method of manufacture of a DC electric motor operable over a range of voltage by virtue of a DC-DC regulator having an inductance provided by one or more windings on the stator of the motor. A conductor is wound about an interpole of the stator and coupled, as an inductance, to a voltage regulator circuit, allowing operation of the DC motor over a substantial range of input voltage.

7 Claims, 3 Drawing Sheets

US 7,541,761 B2

ELECTRIC MOTOR WITH INTEGRAL REGULATOR INDUCTANCE

The present application claims the priority of U.S. Provisional Application Ser. No. 60/709,548, filed Aug. 19, 2005, which application is incorporated herein by reference.

FIELD OF THE INVENTION

The present invention generally relates to motors and, more particularly, to the integration of an inductor for an external circuit onto the stator of a motor.

BACKGROUND OF THE INVENTION

Conventional motors are typically comprised of a rotational portion (a "rotor"), a stationary portion (a "stator") to which the rotor is rotationally coupled, and circuitry that causes the rotor to rotate in a predetermined manner.

The speed of a DC motor is governed, in part, by the voltage applied to its field windings. Consequently, the voltage appearing across the field windings may significantly affect whether the motor operates within the design specifications of the application in which the motor is employed. On the other hand, it may be desirable to provide for operation of the motor under a large range of available voltages.

Therefore, regulator circuits, or DC-to-DC converters, are provided in order to supply a specified voltage across the motor field windings at any particular time. Various regulator circuits are employed in the art, typically characterized by a significant inductive reactance which allows energy to be stored during a portion of each of a series of pulses imposed on the input supply voltage.

One example of a regulator circuit is a buck regulator. FIG. 1 depicts a typical buck regulator circuit 8. In the buck regulator 8, a controller 10, which can be an integrated circuit, provides a periodic switching voltage to a pass switch 12, represented in FIG. 1, for example, by a transistor, thereby allowing input voltage $V_{in}$ to be applied, with some periodic functional form, across a rectifier, or diode 14. Current flows in the circuit containing an inductor 16, a capacitor 18, and the diode 14 during complementary portions of the periodic function to those of current flow through the pass switch 12 such that energy is effectively stored in the inductor 16 during those portions of the cycle when power is not being supplied directly by current through the pass switch. Thus, high efficiency is advantageously obtained, and the power delivered by applying output voltage $V_{out}$ across the motor field windings, as load, is only weakly dependent on input voltage $V_{in}$. The controller 10 adjusts the switching duty cycle of the pass switch 12 in order to maintain a specified output voltage.

The presence of the buck regulator 8, however, increases the volumetric space requirements within a motor housing in the design of a motor for a specified application. Moreover, circuit inefficiencies lead to regulator circuit heating and increased heat dissipation requirements. In particular, the requirement of a large inductor, typically characterized by inductances on the order of 100 µH, and current capacity on the same order as that of the motor field windings, impose significant design costs in both "real estate" and manufacturing cost.

SUMMARY OF THE INVENTION

In accordance with one aspect of the invention, a motor is provided that is capable of operation over a substantial range of input voltage. The motor has a stator characterized by pole sections and interpole sections, with a coil of conductive wire wound about at least one of the interpole sections. Additionally, the motor has a regulator circuit incorporating the coil of conductive winding about a motor interpole section as an inductive circuit element.

In accordance with another aspect of the present invention, an improvement is provided for a voltage regulator circuit that governs a voltage applied to field windings of a DC motor. The improvement includes a winding of conductor about an interpole of the stator yoke of the DC motor, where the winding is characterized by an inductance that is electrically coupled, in turn, to the voltage regulator circuit.

In accordance with a further aspect of the present invention, a method is provided for regulating a voltage applied across a field winding of a DC motor. The method has steps of converting the applied voltage to periodic pulses, and smoothing the periodic pulses in a circuit including an inductor wound about a stator interpole of the DC motor.

In accordance with yet another aspect of the present invention, a method is provided for manufacturing a motor characterized by a rotor and a stator. The method of manufacture has steps of winding field windings on poles of the stator and additionally winding at least one inductive winding on an interpole of the stator. The method then has the step of electrically coupling the inductive winding to a voltage regulator circuit.

BRIEF DESCRIPTION OF THE DRAWINGS

The foregoing advantages of the invention will be appreciated more fully by reference to the following description taken with the accompanying drawings wherein.

DESCRIPTION OF ILLUSTRATIVE EMBODIMENTS

In accordance with preferred embodiments of the present invention, continuous performance of a low-voltage motor is maintained over a wide range of input voltage without the cost and physical displacement requirements typically associated with a DC-to-DC transformer.

Figure 1:
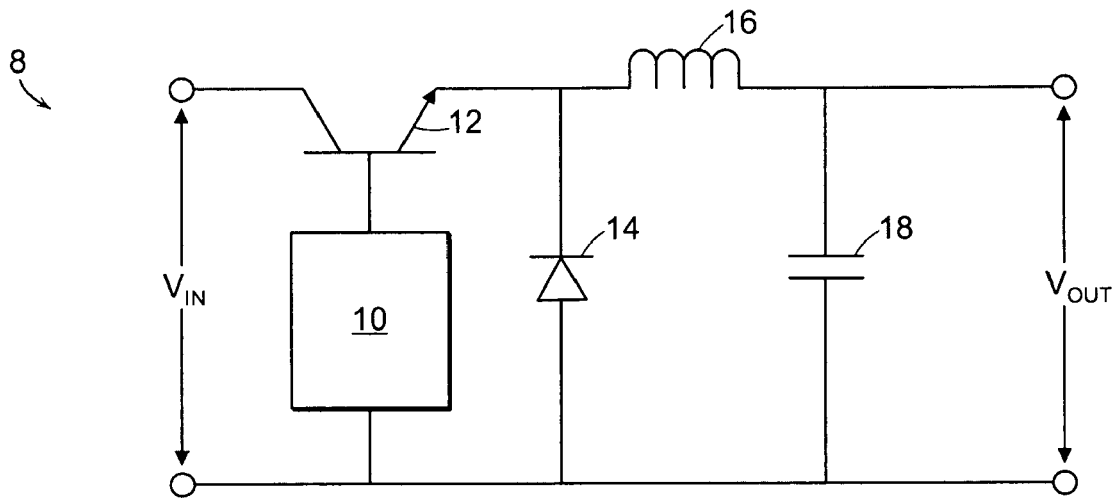
FIG. 1 is a schematic circuit diagram of a prior art DC-DC voltage regulator with typical constituent functional components.
Figure 2:
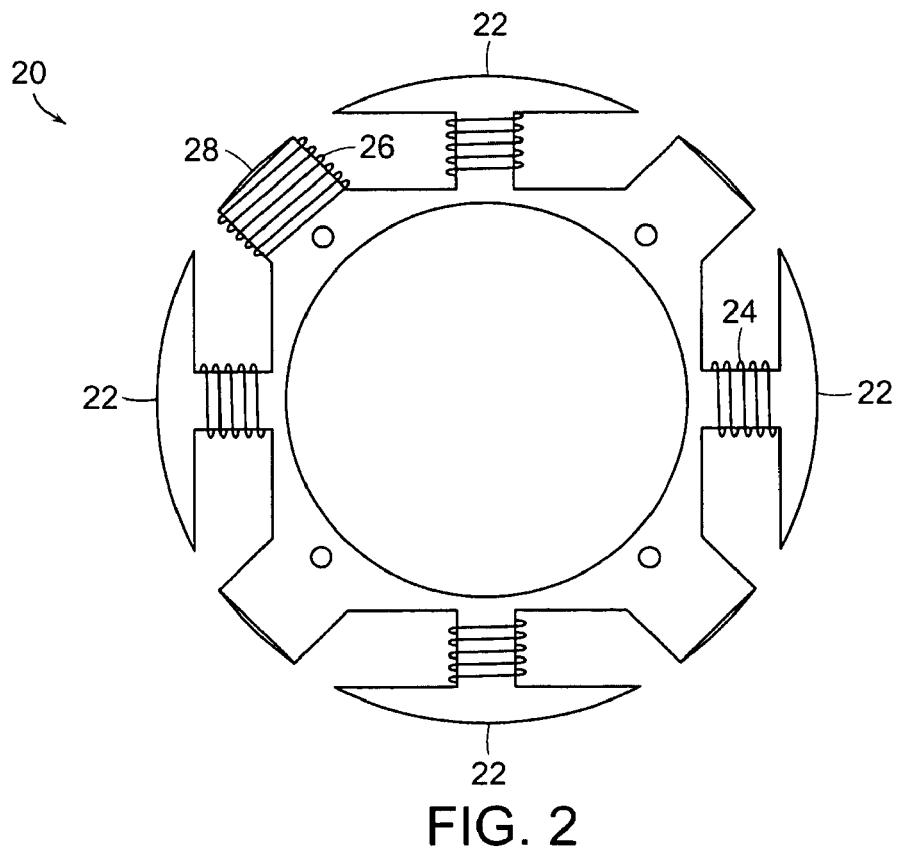
FIG. 2 is a view of windings on the stator yoke of a DC motor in accordance with an embodiment of the invention.

Referring, now, to FIG. 2, a stator yoke 20 of a DC motor is depicted. Poles 22 of the stator, of which four are shown as representative of a four-pole motor, are wound with multiple turns of a conductor forming field windings 24, as is ordinary practice in the winding of a motor stator. The field windings 24 are driven in accordance with ordinary practice by periodic field commutation in specified phase angle relation to the shaft angle of the motor armature. The motor armature, and any attached propeller constituting a fan, are not shown but are standard components. Motor field winding actuation is provided by a motor driver, or motor field winding drive circuitry 32, shown in FIG. 3. For additional details relating to some of the circuit elements that may be included as part of motor field winding drive circuitry 32, see, for example, applicant's earlier U.S. Pat. No. 4,656,553, the disclosure of which is incorporated herein, in its entirety, by reference.

Figure 3:
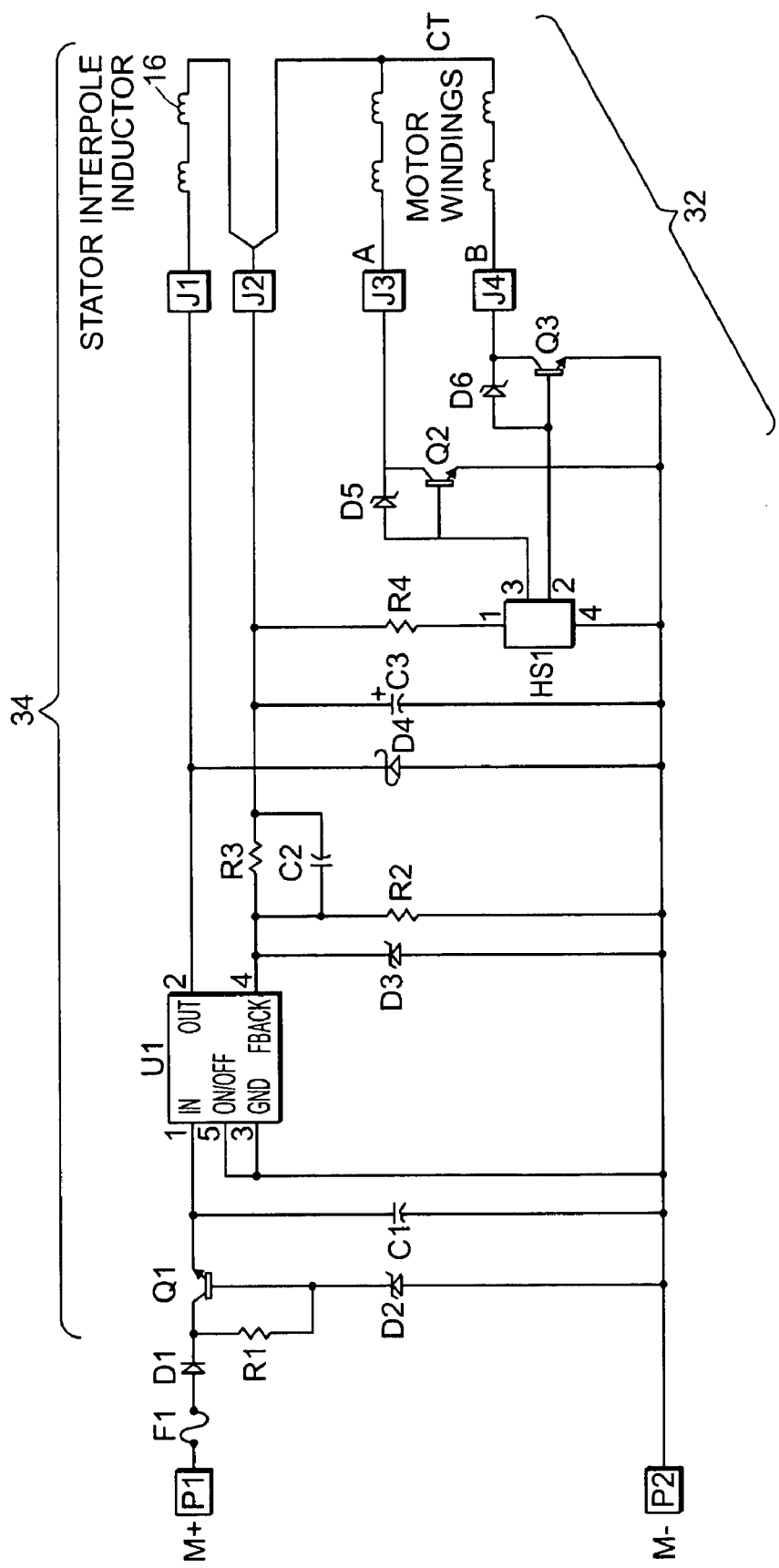
FIG. 3 is a schematic circuit diagram of a motor driver in which inductance is provided by an inductor wound around one or more interpoles of a DC motor, in accordance with an embodiment of the present invention.

In order to allow a motor to operate over an input range of 12-72 V, with substantially constant performance from 24-72 V, a regulator circuit 34 (shown in FIG. 3) is provided as part of the motor driver 32 in FIG. 3. The regulator circuit 34, of which a buck regulator is shown as an exemplary embodiment, includes a series of inductors 16 which is constituted by one or more windings 26 of electrically conductive wire, wound about one or more interpoles 28 of the stator 20 (shown in FIG. 2). The term "interpole," as used herein, and in any appended claims, unless the context dictates otherwise, refers to a region of the stator 20 that does not constitute a pole 22 of the motor.

Figure 4:
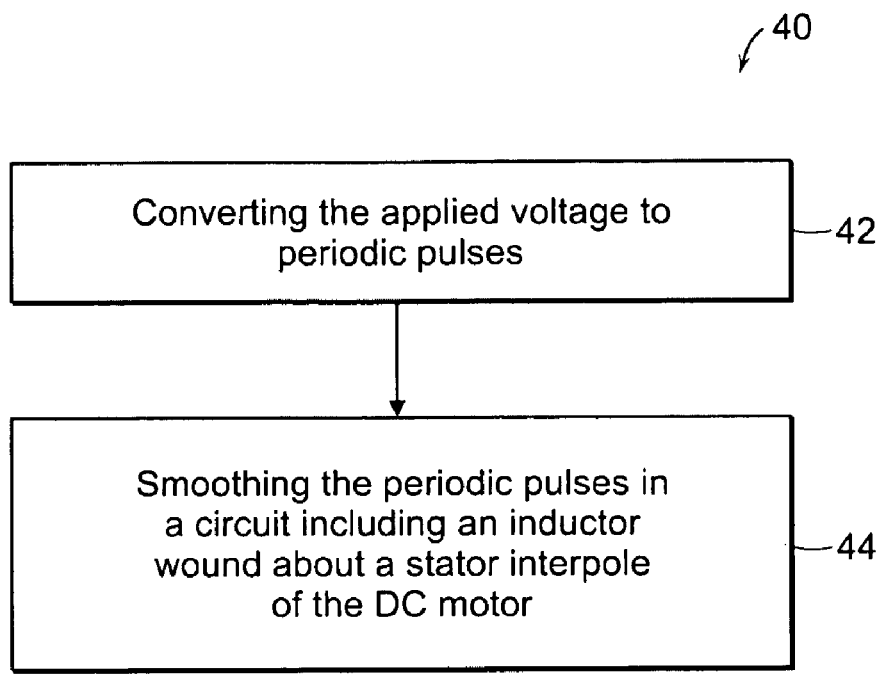
FIG. 4 is a block diagram of a method of regulating a voltage applied across a field winding of a DC motor, in accordance with an embodiment of the invention.

FIG. 4 depicts a block diagram for a method of regulating 40 a voltage applied across a field winding 24 of a DC motor. The method has the step of converting an applied voltage to periodic pulses 42. As discussed above, this can be accomplished, using a controller 10 and a pass switch 12 such as a transistor. The periodic pulses are then smoothed 44 using an inductor 16 wound around the interpole 28 of the stator 20 of the DC motor.

Figure 5:
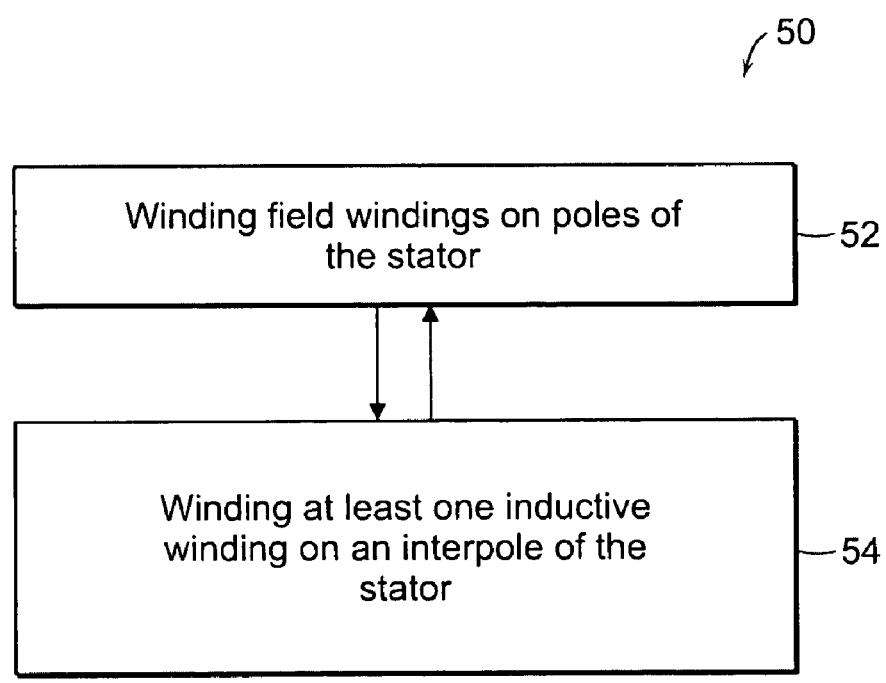
FIG. 5 is a block diagram for a method of manufacturing a motor with an inductor wound around one or more interpoles, in accordance with an embodiment of the invention.

FIG. 5 depicts a block diagram for a method of manufacturing 50 a motor with an inductor 16 wound around one or more interpoles 28. The method has the steps of winding field windings on poles of the stator 52 and winding at least one inductive winding on the interpole of the stator 54. Once the inductor 16 is wound onto the interpole 28 it can be coupled to a voltage regulator circuit. Winding of the inductor 16 on one or more interpoles 28 of stator 20 allows the inductor to make use of and take advantage of the high magnetic permeability typical of a motor stator. Moreover, particularly since the current-carrying requirement of the regulator inductor 16 is substantially identical to that of the field windings 24, one or more interpole inductance windings 26 are conveniently wound in the same manufacturing process as the winding of field windings 24. Thereby, the simultaneous winding advantageously eliminates both the cost and space requirements of an external inductor. Added advantages may include reduced customer part stocking requirements and applications flexibility.

In accordance with preferred embodiments of the invention, the buck regulator 34 is operated at a pulse frequency that is higher than the motor commutation frequency. Regulator pulse frequencies in the range of 100-300 kHz are representative, while motor commutation frequencies are more typically in the range of 200-400 Hz. Due to the much higher frequency of the regulator, any field induced into the stator core does not affect motor magnetics.

On the other hand, the rotating magnetic field due to the rotating permanent magnets of the rotor induces a secondary voltage into inductor 16, thereby acting as a generator and reducing the regulator duty cycle. The consequent effects of increased efficiency and reduced regulator heating have been measured.

While the above discussion discloses various exemplary embodiments of the invention, it should be apparent that those skilled in the art can make various modifications that will achieve some of the advantages of the invention without departing from the true scope of the invention.

What is claimed is:

1. In a voltage regulator circuit for governing a voltage applied to field windings of a DC motor having a stator yoke and characterized in operation by a commutation frequency, the improvement comprising:
   a winding of conductor about an interpole of the stator yoke, the winding characterized by an inductance electrically coupled to the voltage regulator circuit, wherein the voltage regulator circuit is a buck regulator designed for operation at a pulse frequency that is higher than the motor commutation frequency.

2. A motor capable of operation over a substantial range of input voltage, the motor characterized in operation by a commutation frequency, the motor comprising:
   a stator characterized by pole sections and interpole sections;
   a coil of conductive wire wound about at least one of the interpole sections; and
   a regulator circuit incorporating the coil of conductive winding as an inductive circuit element; wherein the regulator circuit is a buck regulator designed for operation at a pulse frequency that is higher than the motor commutation frequency.

3. A method for regulating a voltage applied across a field winding of a DC motor, the method comprising:
   converting the applied voltage to periodic pulses; and
   smoothing the periodic pulses in a circuit including an inductor wound about a stator interpole of the DC motor.

4. A method in accordance with claim 3, wherein the step of converting the applied voltage to periodic pulses is done by a controller providing a periodic switching voltage to a pass switch.

5. A method in accordance with claim 4, wherein the pass switch is a transistor.

6. A method in accordance with claim 4, wherein the controller is an integrated circuit.

7. A motor capable of operation over a substantial range of input voltage, the motor characterized in operation by a commutation frequency, the motor comprising:
   a stator characterized by pole sections and interpole sections;
   a coil of conductive wire wound about at least one of the interpole sections; and
   a regulator circuit incorporating the coil of conductive winding as an inductive circuit element;
   a rotor section having rotating magnets, wherein the rotating magnets of the rotor section induce a secondary voltage into the inductive circuit element;
   wherein the steps of converting the applied voltage to periodic pulses and smoothing the periodic pulses are performed by means of a buck regulator.

* * * * *